(12) United States Patent
Pernici et al.

(10) Patent No.: US 9,682,661 B1
(45) Date of Patent: Jun. 20, 2017

(54) UNIVERSALLY POSITIONAL ARTICLE MOUNTING ASSEMBLIES AND METHODS

(71) Applicants: T. Scott Pernici, Shreveport, LA (US); Thomas P. Pernici, Shreveport, LA (US)

(72) Inventors: T. Scott Pernici, Shreveport, LA (US); Thomas P. Pernici, Shreveport, LA (US)

( * ) Notice: Subject to any disclaimer, the term of this patent is extended or adjusted under 35 U.S.C. 154(b) by 0 days.

(21) Appl. No.: 14/591,443

(22) Filed: Jan. 7, 2015

(51) Int. Cl.
*B60R 1/00* (2006.01)
*B60R 11/00* (2006.01)
*G09F 19/02* (2006.01)

(52) U.S. Cl.
CPC ............. *B60R 11/00* (2013.01); *G09F 19/02* (2013.01); *B60R 2011/0042* (2013.01)

(58) Field of Classification Search
CPC ......... F16M 13/00; F16M 13/02; F16M 11/40
USPC .... 248/160, 230.71, 230.6, 274.1, 686, 693, 248/309.1; 411/446, 447, 451.1, 452, 411/456, 451.3, 472, 487, 488, 489, 490, 411/492, 494, 493, 497
See application file for complete search history.

(56) References Cited

U.S. PATENT DOCUMENTS

| | | | | |
|---|---|---|---|---|
| 2,182 A * | 7/1841 | Ballard | ......................... | 411/452 |
| 171,043 A * | 12/1875 | Pillsbury | ....................... | 411/489 |
| 300,066 A * | 6/1884 | Goldie | .......................... | 411/493 |
| 457,582 A * | 8/1891 | Goldie | .......................... | 411/489 |
| 1,361,574 A * | 12/1920 | Frater, Jr. | ...................... | 248/300 |
| 1,915,958 A | 6/1933 | Skirrow | | |
| 3,812,781 A * | 5/1974 | Bissonet | ....................... | 101/298 |
| 4,728,237 A * | 3/1988 | Lorincz et al. | ............ | 411/451.5 |
| 5,002,327 A | 3/1991 | Bickford | | |
| 5,025,919 A * | 6/1991 | Brinker et al. | ............... | 206/214 |
| 5,282,598 A * | 2/1994 | Greene | ....................... | 248/311.2 |
| 5,427,254 A * | 6/1995 | Knieriem | ........................ | 211/50 |
| 5,480,037 A * | 1/1996 | Pope | .............................. | 211/50 |
| 5,489,055 A | 2/1996 | Levy | | |
| 5,720,458 A * | 2/1998 | Carpenter | .................. | 248/205.1 |
| 5,890,985 A * | 4/1999 | Jenney | .......................... | 473/447 |
| 6,029,384 A | 2/2000 | McLaughlin | | |
| 6,065,656 A * | 5/2000 | Elshof | .......................... | 224/275 |
| 6,125,566 A | 10/2000 | McLaughlin | | |
| 6,851,906 B2 * | 2/2005 | Gassmann et al. | ........... | 411/440 |
| 7,627,970 B2 * | 12/2009 | Berteau | .......................... | 40/617 |
| 7,861,985 B2 * | 1/2011 | Galvin | ................... | F16M 11/40 248/160 |
| 7,905,456 B2 * | 3/2011 | Gough | .......................... | 248/160 |
| 8,317,445 B2 * | 11/2012 | Reeder | .......................... | 411/439 |
| 8,505,795 B2 | 8/2013 | Dunn | | |
| 8,727,290 B1 * | 5/2014 | De La Matta et al. | ....... | 248/160 |
| 8,746,650 B2 | 6/2014 | Curatolo et al. | | |
| 9,028,187 B2 * | 5/2015 | Tebo | ............................. | 411/493 |
| 2002/0047078 A1 * | 4/2002 | Li | .............................. | 248/311.2 |

(Continued)

*Primary Examiner* — Nkeisha Smith
(74) *Attorney, Agent, or Firm* — R. Keith Harrison

(57) ABSTRACT

Universally positional article mounting assemblies include a mounting tab having a generally flat or planar tab panel including an article mount edge, a tab insert end opposite the article mount edge, a pair of tab side edges extending from the article mount edge to the tab insert end, a first panel surface; and a second panel surface, a universally manipulatable article stem carried by the article mount edge of the tab panel and at least one article carried by the article stem. Universally positional article mounting methods are also disclosed.

10 Claims, 10 Drawing Sheets

(56) References Cited

U.S. PATENT DOCUMENTS

2012/0049030 A1\* 3/2012 Tussy .................. 248/311.2
2014/0138418 A1 5/2014 Dunn \* cited by examiner

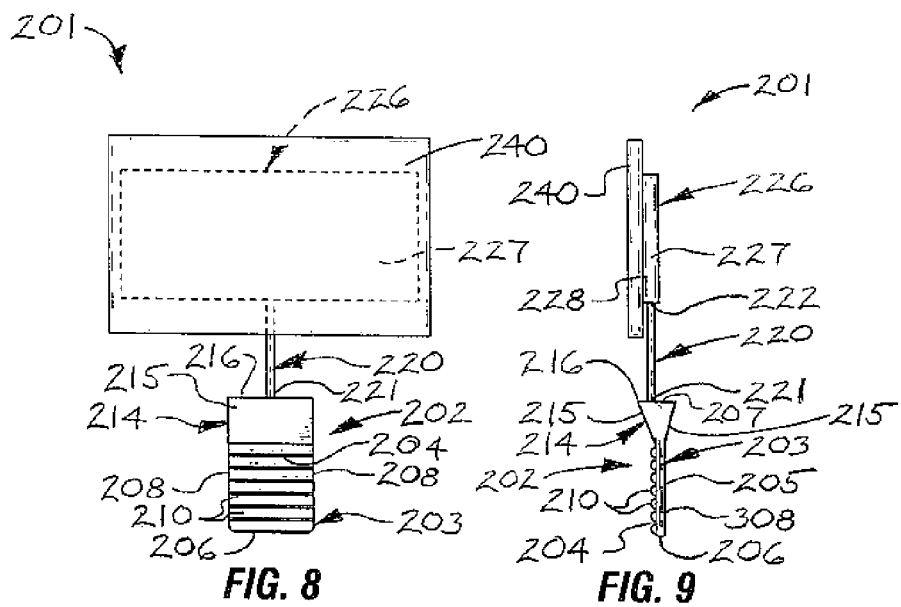
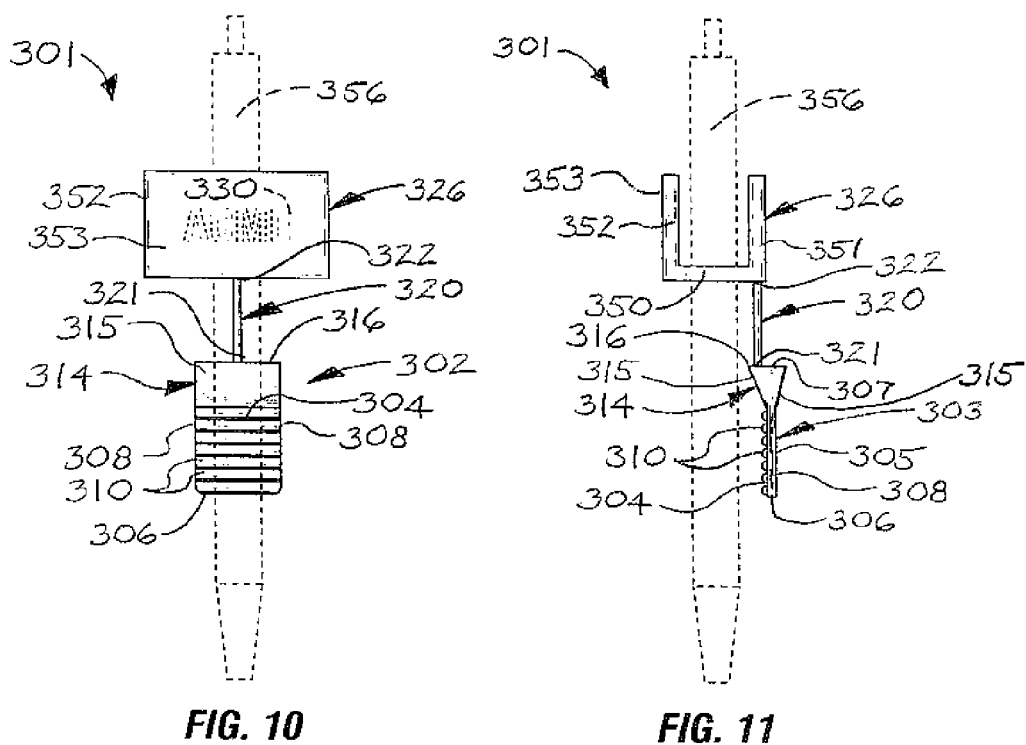

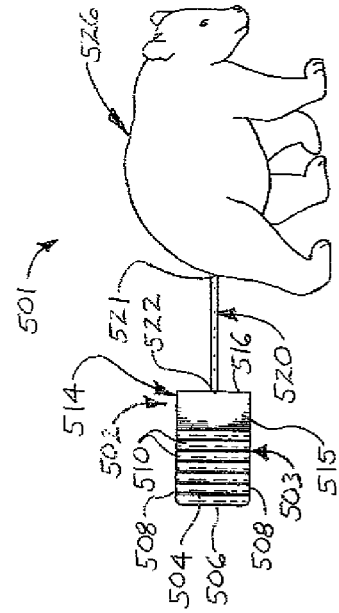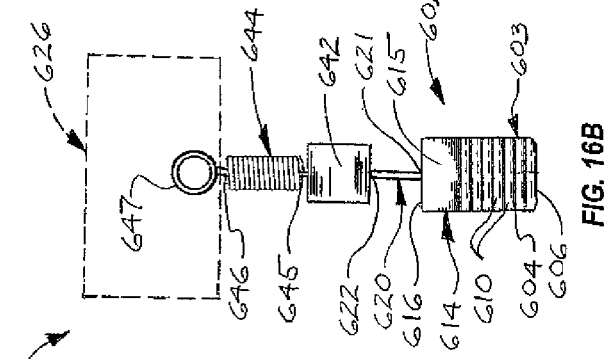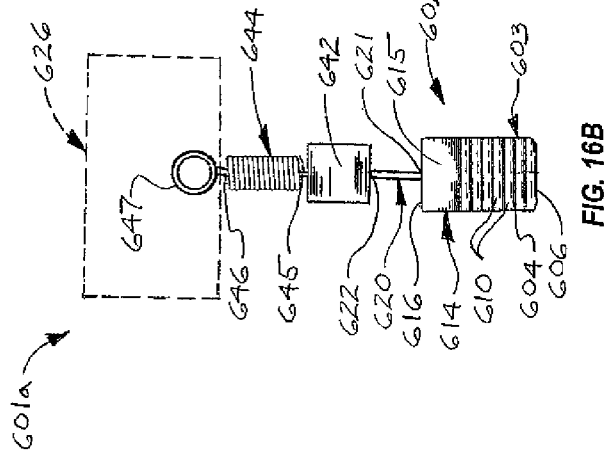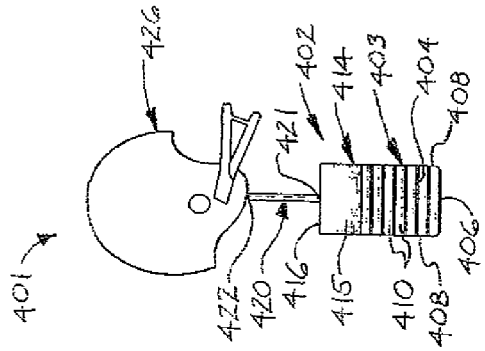

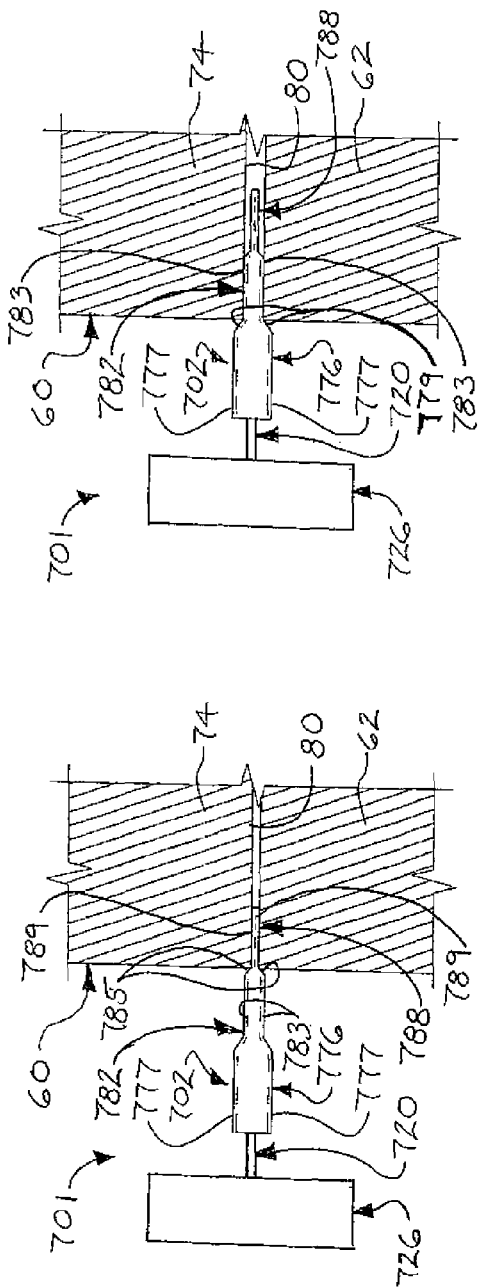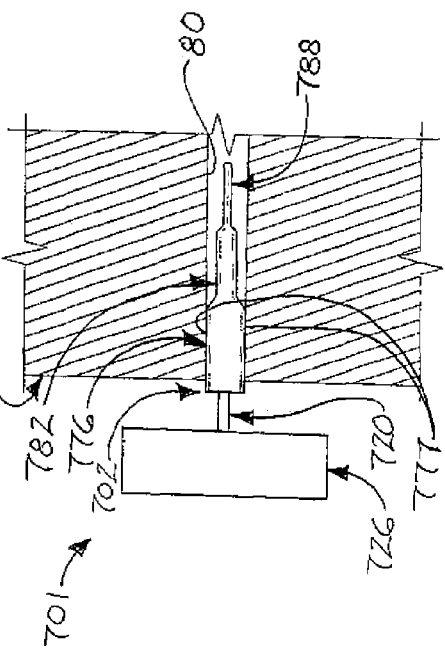

UNIVERSALLY POSITIONAL ARTICLE MOUNTING ASSEMBLIES AND METHODS

FIELD

Illustrative embodiments of the disclosure generally relate to articles. More particularly, illustrative embodiments of the disclosure relate to universally positional article mounting assemblies and methods which facilitate removable attachment and universal positioning of various articles such as advertising or decorative elements, note pads, writing implements and the like to the interior of a vehicle in visible and/or accessible and retrievable locations or positions.

SUMMARY

Illustrative embodiments of the disclosure are generally directed to universally positional article mounting assemblies. An illustrative embodiment of the universally positional article mounting assemblies includes a mounting tab having a generally flat or planar tab panel including an article mount edge, a tab insert end opposite the article mount edge, a pair of tab side edges extending from the article mount edge to the tab insert end, a first panel surface; and a second panel surface, as universally manipulatable article stem carried by the article mount edge of the tab panel and at least one article carried by the article stem.

Illustrative embodiments of the disclosure are further generally directed to universally positional article mounting methods. An illustrative embodiment of the universally positional article mounting methods includes obtaining an article mounting assembly having a mounting tab, a universally manipulatable article stem extending from the mounting pad and at least one article on the article stem: locating a crevice on a vehicle interior for attachment of the article mounting assembly to the vehicle interior: inserting the mounting tab of the article mounting assembly in the crevice; and physically manipulating the article stem to spatially orient the article.

BRIEF DESCRIPTION OF THE DRAWINGS

Illustrative embodiments of the disclosure will now be described, by way of example, with reference to the accompanying drawings, in which:

FIG. 8 is a front view of yet another illustrative embodiment of the universally positional article mounting assemblies, with a note pad attached to the article (illustrated in phantom) of the assembly;

FIG. 9 is a side view of the illustrative universally positional article mounting assembly illustrated in FIG. 8;

FIG. 10 is a front view of still another illustrative embodiment of the universally positional article mounting assemblies, with a writing implement (illustrated in phantom) deployed in the universally positional article mounting assembly for selective retrieval and use by an occupant of the vehicle;

FIG. 11 is a side view of the illustrative universally positional article mounting assembly illustrated in FIG. 10, with the writing implement (illustrated in phantom) deployed in the assembly;

FIG. 14 is a front view of a non-limiting example of the universally positional article mounting assemblies, with the article in the shape of a football helmet for display in the vehicle interior;

FIG. 15 is a front view of another non-limiting example of the universally positional article mounting assemblies, with the article in the shape of a bear for display in the vehicle interior;

FIG. 16A is a front view of yet another alternative illustrative embodiment of the universally positional article mounting assemblies, with an article stem extending from the mounting tab and an article spring supported by the article stem, more particularly illustrating an article in the form and appearance of a bear mounted to the article spring;

FIG. 16B is a front view of yet another alternative illustrative embodiment of the universally positional article mounting assemblies, with an article stem extending from the mounting tab and an article spring supported by the article stem, more particularly illustrating an article in the form of a display panel connected to an article mounting loop on the article spring;

FIG. 18 is a sectional view of a portion of the vehicle interior, with an illustrative universally positional article mounting assembly (illustrated in side view) having the multi-tiered mounting tab illustrated in FIG. 17 attached to the vehicle interior, more particularly illustrating insertion of a terminal tab insertion segment of the multi-tiered mounting tab of the assembly into a narrow crevice in the vehicle interior in typical application of the assembly;

FIG. 19 is a sectional view of a portion of the vehicle interior, with an illustrative universally positional article mounting assembly (illustrated in side view) having the multi-tiered mounting tab illustrated in FIG. 17 attached to the vehicle interior, more particularly illustrating insertion of a terminal tab insertion segment of the multi-tiered mounting tab of the assembly into a crevice of intermediate width in the vehicle interior in typical application of the assembly;

FIG. 20 is a sectional view of a portion of the vehicle interior, with an illustrative universally positional article mounting assembly (illustrated in side view) having the multi-tiered mounting tab illustrated in FIG. 17 attached to the vehicle interior, more particularly illustrating insertion of a terminal tab insertion segment of the multi-tiered mounting tab of the assembly into a wide crevice in the vehicle interior in typical application of the assembly;

DETAILED DESCRIPTION

Figure 1:
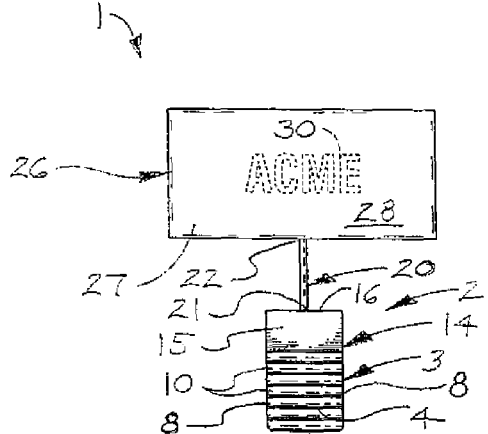
FIG. 1 is a front view of an illustrative embodiment of the universally positional article mounting assemblies.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is non-limiting and is not necessarily to be construed as preferred or advantageous over other implementations. All of the implementations described below are exemplary implementation provided to enable a person skilled in the art to practice the disclosure and are not intended to limit the scope of the appended claims. Moreover, the illustrative embodiments described herein are not exhaustive and embodiments were implementations other than those which are described herein in which fall within the scope of the appended claims are possible. Furthermore, there is no intention to be bound by any expressed or implied theory presented in the preceding technical field, background, brief summary or the following detailed description.

Referring initially to FIGS. 1-5 of the drawings, an illustrative embodiment of the universally positional article mounting assemblies, hereinafter assembly, is generally indicated by reference numeral 1. The assembly 1 is suitable for mounting at least one article 26 at a selected location or position within a vehicle interior 60 (FIG. 12) of a vehicle in typical application of the assembly 1, which will be hereinafter described. The vehicle interior 60 may include but is not limited to the vehicle dashboard, vehicle center console, vehicle ceiling and interior of the vehicle door (not illustrated). The at least one article 26 may include any object or medium which is to be displayed for viewing and/or access and retrieval for use by an occupant of the vehicle. Non-limiting examples of the article 26 include physical embodiments of a two-dimensional or three-dimensional design, shape, symbol or image; advertising insignia; sports team images, logos and/or names; slogans, sayings or quotes; note pads; pencils, pens and other writing implements; skin moisturizing formulations; and support structures or holders which support or hold one or more secondary articles for display and/or use.

Figure 3:
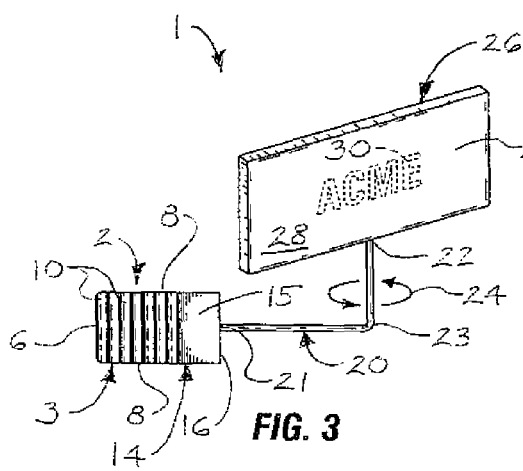
FIG. 3 is a perspective view of an illustrative universally positional article mounting assembly, with a bendable article stem of the assembly disposed in a 90-degree bend and partially rotated or twisted to deploy an article at a selected orientation for viewing in attachment of the article to a vehicle interior (not illustrated)
Figure 4:
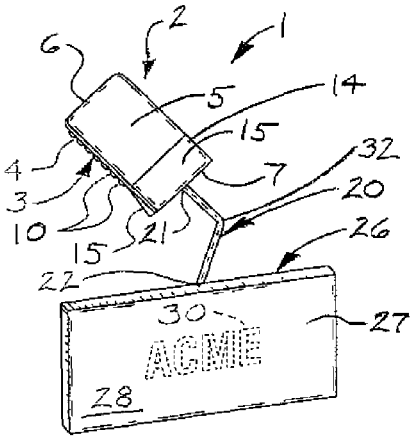
FIG. 4 is a perspective view of an illustrative universally positional article mounting assembly, with the bendable article stem of the assembly disposed in an obtuse angle bend to deploy the article at a selected orientation for display in the vehicle interior.
Figure 5:
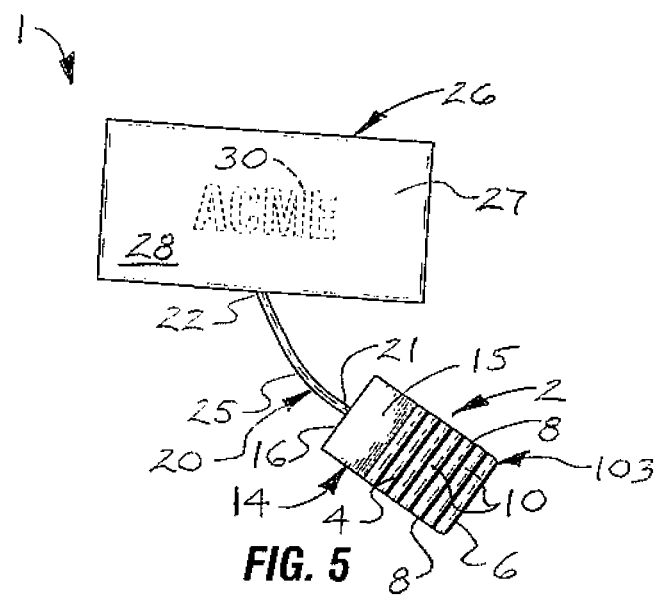
FIG. 5 is a front view of an illustrative universally positional article mounting assembly, with the article stem disposed in a gradual bend and the article deployed in another orientation for display in the vehicle interior.

The assembly 1 includes a mounting tab 2. A multi-positional or universally manipulatable article stem 20 extends from the mounting tab 2. The article 26 is supported by and may be attached to the article stem 20 according to any suitable technique which is known by those skilled in the art. As illustrated in FIGS. 3-5 and will be hereinafter described, the article stem 20 can be selectively bended, rotated, twisted and/or otherwise universally spatially manipulated into a desired two-dimensional or three-dimensional position or configuration to support or hold the article 26 on the vehicle interior 60 in a desired orientation for display and/or retrieval and use by one or more occupants of the vehicle.

The mounting tab 2 may include a generally flat or planar tab panel 3 which may be generally elongated and rectangular in some embodiments. The tab panel 3 may be fabricated of paper, plastic, rubber, metal and/or other rigid or semi-rigid material which facilitates insertion of the tab panel 3 into a crack, gap, joint, seam or crevice (hereinafter crevice, illustrated as reference numerals 61, 66, 70 and 73, respectively, in FIG. 12) between adjacent panels or components in a vehicle dashboard or other location or position in the vehicle interior 60 to mount the article 26 in a selected visible and/or accessible and retrievable location or position within the vehicle interior 60. In the non-limiting example illustrated in FIGS. 12 and 13, a first crevice 61 extends between a main dashboard portion 62 and an airbag cover 63 in the vehicle interior 60. A second crevice 66 extends between the main dashboard portion 62 and a vehicle glove compartment door 67. A third crevice 70 extends between the main dashboard portion 62 and a vehicle center console 71. A fourth crevice 73 extends between the main dashboard portion 62 and a dashboard panel 74. However, in various applications of the assembly 1, the mounting tab 2 may be inserted into crevices (not illustrated) in other locations, positions, areas, compartments or components within the vehicle interior 60, including but not limited to the vehicle ceiling and interior of a vehicle door (not illustrated).

In some embodiments, the tab panel 3 of the mounting tab 2 may be generally elongated with a first panel surface 4, a second panel surface 5, a tab insert end 6, an article mount edge 7 and a pair of tab side edges 8 which extend between the tab insert end 6 and the article mount edge 7. The tab side edges 8 may be generally parallel to each other. Alternatively, the tab side edges 8 may gradually taper toward each other from the article mount edge 7 to the tab insert end 6. Thus, the tab insert end 6 may be rounded or pointed in some embodiments.

In some embodiments, a tab head 14 may protrude from at least one of the first panel surface 4 and the second panel surface 5 of the tab panel 3. In some embodiments, the tab head 14 may be molded and/or otherwise fabricated integrally with the tab panel 3 of the mounting tab 2. In other embodiments, the tab head 14 may be applied to the tab panel 3 according to the knowledge of those skilled in the art. The tab head 14 may be generally wedge-shaped with a stem mount surface 16 which may be generally flush or even with the article mount edge 7 of the tab panel 3. A beveled vehicle interior engaging surface 15 may slope or angle from the stem mount surface 16 toward the tab insert end 6 and terminate at the first panel surface 4 and/or the second panel surface 5 of the tab panel 3. In some embodiments, multiple tab ridges 10 may protrude from at least one of the first panel surface 4 and the second panel surface 5 between the vehicle interior engaging surface 15 of the tab head 14 and the tab insert end 6 of the tab panel 3 in a selected number and pattern. The tab head 14 may gradually increase the width of the mounting tab 2 to facilitate secure insertion of the mounting tab 2 into crevices having a wide variety of widths and increase the number of possible locations or positions which a user can select to mount the assembly 1 within the vehicle interior 60, as will be hereinafter described. In alternative embodiments, the mounting tab 2 may be substantially uniform in thickness from the tab insert end 6 to the article mount edge 7.

Figure 2A:
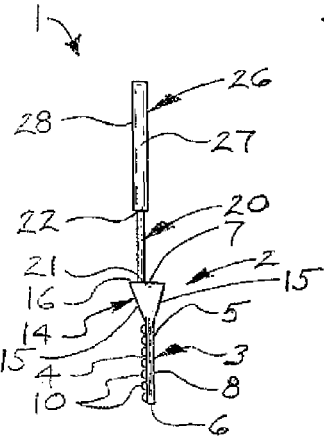
FIG. 2A is a side view of the illustrative universally positional article mounting assembly illustrated in FIG. 1.
Figure 2B:
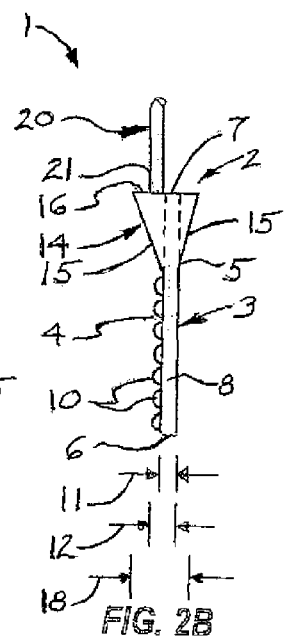
FIG. 2B is an enlarged side view of a typical mounting tab of an illustrative universally positional article mounting assembly, more particularly illustrating various thicknesses for different lengths or portions of the mounting tab.

As illustrated in FIG. 2B, the tab panel 3 of the mounting tab 2 may have a tab panel thickness 11. The tab panel 3 and each of the tab ridges 10 together may have a combined tab ridge thickness 12. The tab panel 3 and the tab head 14 may together have a combined tab head thickness 18. In some embodiments, the tab panel thickness 11 of the mounting tab 2 may be at least about 0.5 mm. The tab ridge thickness 12 may be at least about 0.7 mm. The tab head thickness 18 may be from about 0.8 mm to about 2.75 mm. Accordingly, in attachment of the assemblies 1 to the vehicle interior 60, which will be hereinafter described, the mounting tab 2 is configured to insert into selected crevices 61, 66, 70, 73 having different widths in the vehicle interior 60 to tightly engage the interior surfaces of the crevices and securely support the assemblies 1 at the selected positions or locations on the vehicle interior 60.

The article stem 20 may include any bendable, pliable or workable metal or material which holds its position upon being spatially bent, twisted and otherwise manipulated and then released. Non-limiting examples of materials which are suitable for the article stem 20 include steel, lead, copper, aluminum and combinations thereof. The article stem 20 may have a flat, round or other cross-section which may be constant or variable along its length. The article stem 20 may include a proximal stem end 21 which is attached to the stem mount surface 16 of the tab head 14 and a distal stem end 22 which is opposite the proximal stem end 21. As used herein, "proximal" means closer to the mounting tab 2 and "distal" means farther from the mounting tab 2. The article 26 may be attached to the distal stem end 22 of the article stem 20 using any suitable attachment technique which is known by those skilled in the art. For example and without limitation, in some embodiments, the article 26 may be attached to the distal stem end 22 of the article stem 20 using glue, adhesive, magnetic attachment mechanism or the like. In other embodiments, the distal stem end 22 may be threaded or inserted into or embedded within the article 26. To this end, in some embodiments the distal stem end 22 portion of the article stem 20 may be shaped, looped, coiled or bent to provide an enlarged surface area on which to securely mount the article 26 to the article stem 20 and prevent inadvertent rotation of the article 26 relative to the article stem 20. In still other embodiments, the distal stem end 22 may be molded, laminated or otherwise fabricated integrally with the article 26 according to the knowledge of those skilled in the art.

The at least one article 26 of the assembly 1 may include any type of device, article or two-dimensional or three-dimensional display or medium which a user of the assembly 1 desires to mount on the vehicle interior 60 in a visible or accessible and retrievable location or position and orientation. A non-limiting example of the article 26 includes a flat article panel 27 which may have a display surface 28. Indicia 30 such as advertising information, a sports team logo, saying, slogan, quote or the like may be provided for display on the display surface 28. Photos (not illustrated) and/or other displayable media may be affixed to the display surface 28 using a suitable adhesive (not illustrated), magnetic attachment mechanism or other technique. In some embodiments, a clear or transparent laminated display cover (not illustrated) may be provided on the display surface 28 for insertion of photos and/or other displayable medium for display. In other embodiments, the article 26 may include a sports team logo, symbol, image or panel which is shaped in the form of a football helmet, animal or other object. In still other embodiments, the article 26 may include a note pad, writing implement, skin moisturizing composition or other article which may be useful to one or more occupants of the vehicle.

As illustrated in FIGS. 3-5, the article stem 20 can be bended, twisted and/or otherwise physically manipulated to orient the article 26 at a selected two-dimensional or three-dimensional spatial orientation relative to the mounting tab 2 in order to optimize the visibility and/or accessibility of the article 26 for retrieval from the vehicle interior 60 and use by an occupant of the vehicle. For example and without limitation, as illustrated in FIG. 3, the article stem 20 can be physically manipulated to form one or more 90-degree bends 23 and/or one or more twists 24 to selectively orient the article 26 at the desired orientation. An obtuse angle bend 32 (FIG. 4) or a gradual bend 25 (FIG. 5) can be induced in the article stem 20 depending upon the desired orientation of the article 26 with respect to the mounting tab 2 and the vehicle interior 60.

Figures 12, 12A:
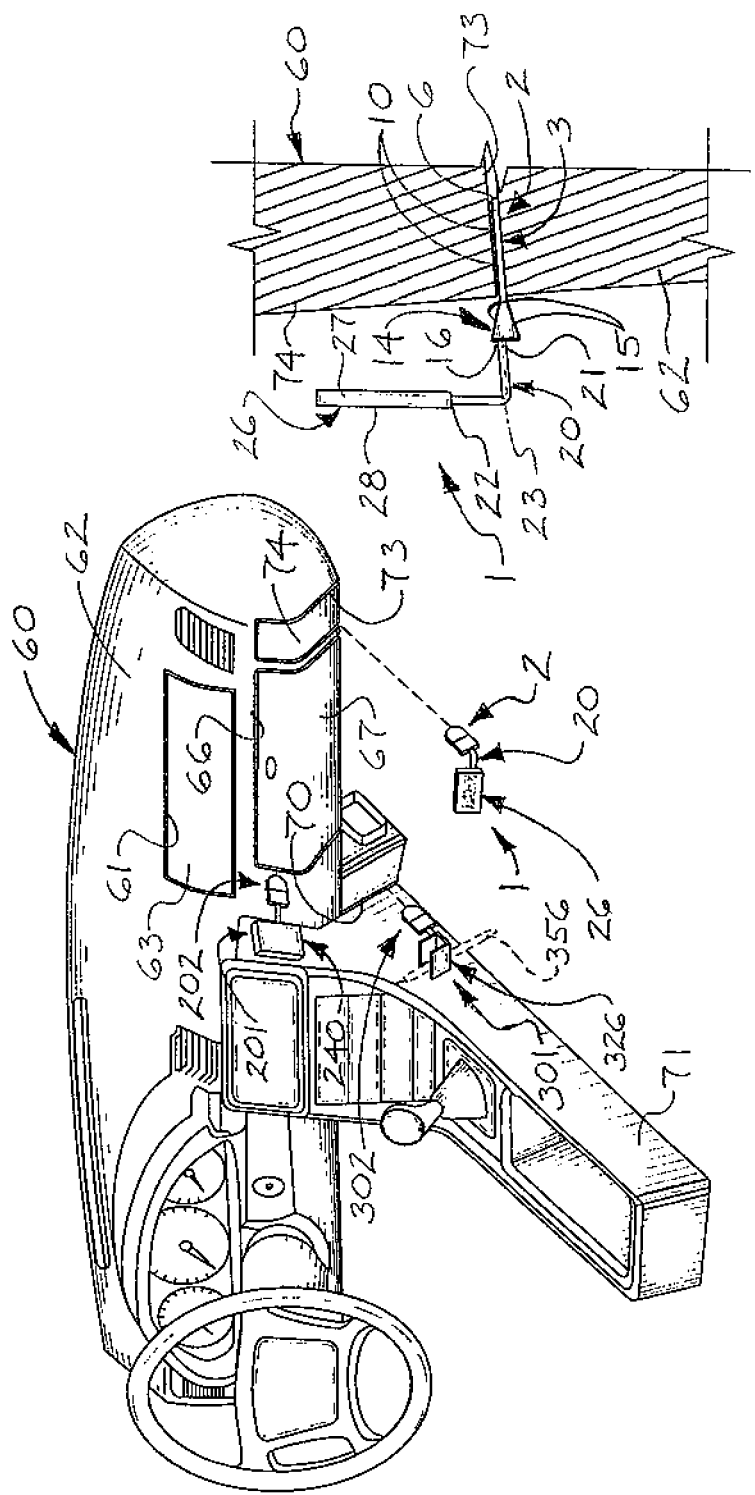
FIG. 12 is a front perspective view of a vehicle interior, with multiple illustrative universally positional article mounting assemblies shown in exploded view in typical engagement of the assemblies with crevices in the vehicle interior for attachment of the articles to the vehicle interior.
FIG. 12A is an enlarged cross-sectional view of a portion of the vehicle interior, with the mounting tab of the illustrative universally positional article mounting assembly inserted in a crevice in the vehicle interior in attachment of the assembly to the vehicle interior according to typical application of the assembly.
Figure 13:
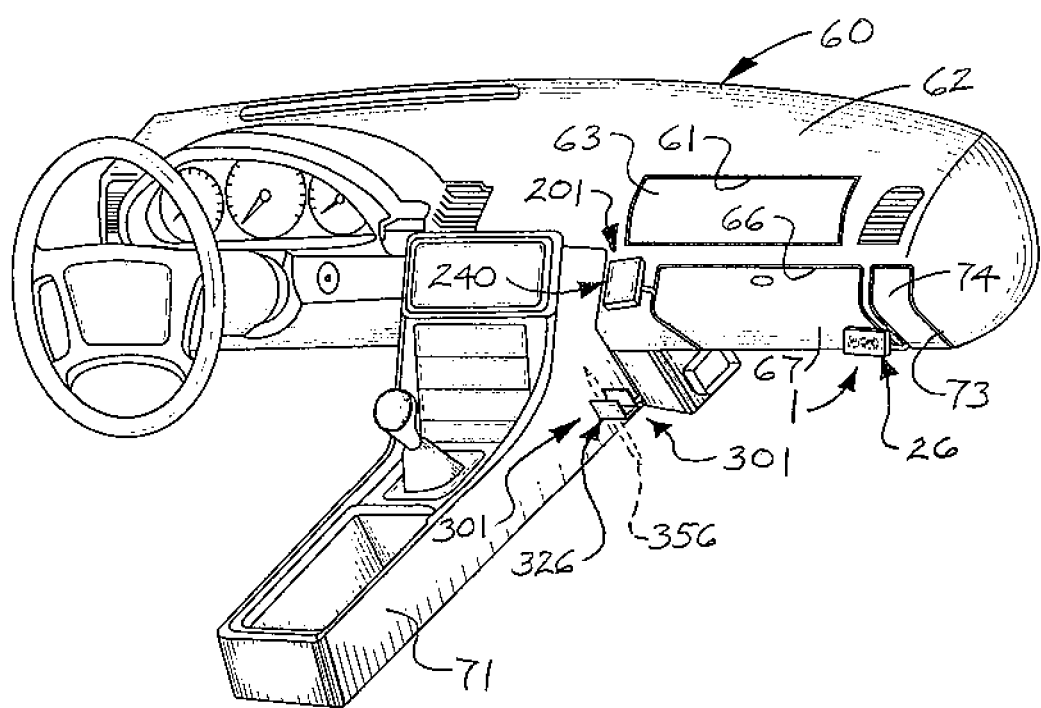
FIG. 13 is a front perspective view of the vehicle interior, with the various universally positional article mounting assemblies deployed in place for viewing and/or access, retrieval and use of the articles by one or more occupants of the vehicle.

Referring next to FIGS. 12, 12A and 13 of the drawings, in typical application of the assembly 1, an article 26 can be mounted in a selected location or position in the vehicle interior 60 to render the article 26 easily visible to and/or accessible and retrievable for use by an occupant of the vehicle. In the non-limiting example illustrated in FIG. 12, the assembly 1 is inserted in a crevice 73 which extends between the main dashboard portion 62 and the dashboard panel 74 on the dashboard in the vehicle interior 60. The article stem 20 may be bent, twisted and/or otherwise physically manipulated to spatially orient the article 26 in such a manner that the article 26 will be visible to occupants of the vehicle when the mounting tab 2 of the assembly 1 is inserted in the crevice 73. Accordingly, after the article stem 20 is suitably manipulated, the mounting tab 2 is inserted in the crevice 73. Alternatively, the article stem 20 may be manipulated after the mounting tab 2 is inserted in the crevice 73. As illustrated in FIG. 12A, the tab ridges 10 on the tab panel 3 of the mounting tab 2 may frictionally engage one of the interior surfaces of the crevice 73 to stabilize the mounting tab 2 within the crevice 73. In some applications, depending upon the width of the crevice 73, the mounting tab 2 may be inserted in the crevice 73 to an extent that the beveled vehicle interior engaging surface or surfaces 15 on the tab head 14 engages the interior surface of the crevice 73 to secure or wedge the mounting tab 2 within the crevice 73. As further illustrated in FIG. 12A, the article 26 may be oriented in generally parallel relationship to the plane of the vehicle interior 60 such that the insignia 30 (FIG. 4) on the article panel 27 of the article 26 is easily visible to as passenger (not illustrated) who sits in the passenger seat of the vehicle. The article 1 can be easily removed or detached from the vehicle interior 60 by pulling the mounting tab 2 from the crevice 73.

Figures 6, 7:
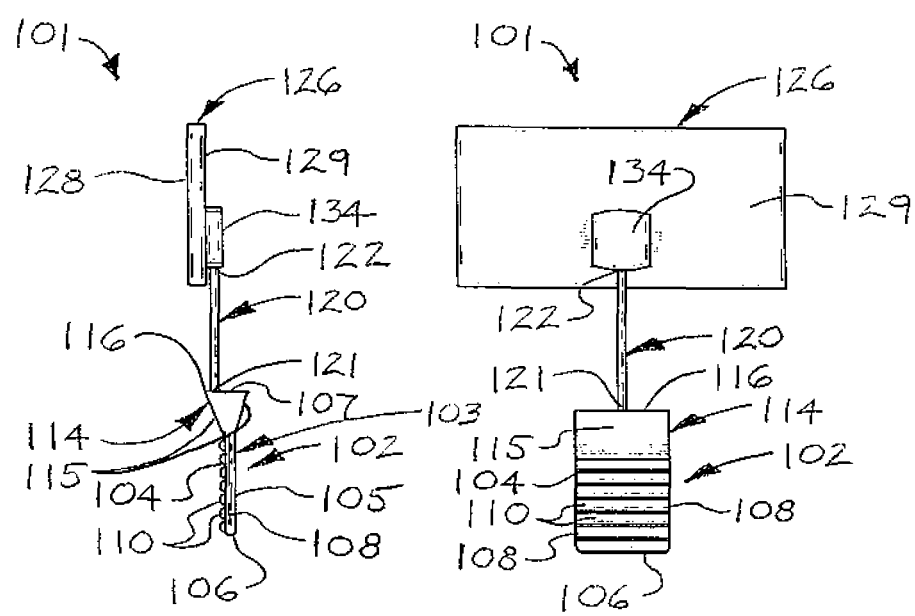
FIG. 6 is a side view of an alternative illustrative embodiment of the universally positional article mounting assemblies.
FIG. 7 is a rear view of the alternative universally positional article mounting assembly illustrated in FIG. 6.

Referring next to FIGS. 6 and 7 of the drawings, an alternative illustrative embodiment of the dashboard mounting article assemblies is generally indicated by reference numeral 101. In the assembly 101, elements which are analogous to the respective elements of the assembly 1 that was heretofore described with respect to FIGS. 1-5 are designated by the same numerals in the 101-199 series in FIGS. 6 and 7. Unless otherwise noted, the elements and features of the assembly 101 may encompass the same descriptions which were heretofore applied to the assembly 1. A article mounting pad 134 may secure the distal stem end 122 of the article stem 120 to a stem attachment surface 129 on the article 126. In some embodiments, the article mounting pad 134 may include glue and/or other adhesive. In other embodiments, the article mounting pad 134 may include plastic, rubber and/or other material which is molded or otherwise fabricated integrally with the article 126, or fabricated separately and attached to the article 126 according to the knowledge of those skilled in the art. Accordingly, the article mounting pad 134 may be attached to the article 126 using an adhesive (not illustrated), magnetic attachment mechanism (not illustrated) or other attachment technique which is known by those skilled in the art. Typical application of the assembly 101 may be as was heretofore described with respect to the assembly 1 in FIGS. 12, 12A and 13.

Referring next to FIGS. 8 and 9 of the drawings, another alternative illustrative embodiment of the dashboard mounting article assemblies is generally indicated by reference numeral 201. In the assembly 201, elements which are analogous to the respective elements of the assembly 1 that was heretofore described with respect to FIGS. 1-5 are designated by the same numerals in the 201-299 series in FIGS. 8 and 9. Unless otherwise noted, the elements and features of the assembly 201 may encompass the same descriptions which were heretofore applied to the assembly 1. The assembly 201 may include an article 226 which is adapted to hold at least one secondary article such as a note pad 240, such as a POST-IT® note pad, for example and without limitation, at a selected optimum location or position in the vehicle interior 60 for retrieval and use by an occupant in the vehicle. The article 226 may include an article panel 227 which is suitable for supporting the note pad 240. The note pad 240 may be secured to a pad attachment surface 228 (FIG. 9) on the article panel 227 using a suitable adhesive (not illustrated), for example and without limitation.

Referring again to FIGS. 12 and 13 of the drawings, typical application of the assembly 201 is illustrated. Accordingly, the assembly 201 may be mounted in the vehicle interior 60 (FIG. 12) by inserting the mounting tab 202 in the crevice 66 in the dashboard or in any other desired location or position within the vehicle interior 60. The article stem 220 (FIGS. 8 and 9) may be physically manipulated to position the article 226 and the note pad 240 in a spatial orientation which renders the note pad 240 easily accessible by an occupant of the vehicle. Thus, individual note sheets (not illustrated) may be selectively and individually removed from the note pad 240 for use by the occupant typically without the need to remove the mounting tab 202 of the assembly 201 from the crevice 66.

Referring next to FIGS. 10 and 11 of the drawings, still another alternative illustrative embodiment of the dashboard mounting article assemblies is generally indicated by reference numeral 301. In the assembly 301, elements which are analogous to the respective elements of the assembly 1 which was heretofore described with respect to FIGS. 1-5 are designated by the same numerals in the 301-399 series in FIGS. 10 and 11. Unless otherwise noted, the elements and features of the assembly 301 may encompass the same descriptions which were heretofore applied to the assembly 1. The assembly 301 may include an article 326 which is adapted to hold at least one secondary article such as a pen, pencil or other writing implement 356 (illustrated in phantom) at a selected optimum location or position in the vehicle interior 60 for retrieval and use by an occupant in the vehicle. The article 326 may include a writing implement holder 350 (FIG. 11). A writing implement opening (not illustrated) which is sized and configured to accommodate the writing implement 356 may extend through the writing implement holder 350. As illustrated in FIG. 11, a rear holder panel 351 and a front holder panel 352 may extend from the writing implement holder 350 in spaced-apart relationship to each other. The distal stem end 322 of the article stem 320 may be attached to the writing implement holder 350 at the rear holder panel 351. As illustrated in FIG. 10, the front holder panel 352 may have a display surface 353 on which indicia 330 may be provided. The writing implement 356 can be secured in the writing implement holder 350 of the article 326 by inserting and seating the writing implement 356 in the writing implement opening (not illustrated) in the writing implement holder 350, as illustrated in phantom in FIGS. 10 and 11.

Referring again to FIGS. 12 and 13 of the drawings, typical application of the assembly 301 is illustrated. The mounting tab 302 of the assembly 301 is shown inserted in a crevice 70 in the dashboard or other location in the vehicle interior 60. An occupant in the vehicle can selectively access and retrieve the writing implement 356 from the article 326 for use by removing the writing implement 356 from the writing implement holder 350 (FIG. 11). After use, the writing implement 356 can be replaced in the writing implement holder 350 for subsequent use.

Referring next to FIG. 14 of the drawings, a non-limiting example of an universally positional article mounting assembly is generally indicated by reference numeral 401, in which like elements corresponding to those of the assembly 1 in FIGS. 1-5 are designated by like reference numerals in the 401-499 series. Unless otherwise noted, the elements and features of the assembly 401 may encompass the same descriptions which were heretofore applied to the assembly 1. The article 426 of the assembly 401 is in the shape of a football helmet. Accordingly, the football helmet 426 may commemorate, celebrate or display a favorite football team of the user. The football helmet 426 may additionally display the colors and/or name of the football team.

Referring next to FIG. 15 of the drawings, another non-limiting example of an universally positional article mounting assembly is generally indicated by reference numeral 501, in which like elements corresponding to those of the assembly 1 in FIGS. 1-5 are designated by like reference numerals in the 501-599 series. Unless otherwise noted, the elements and features of the assembly 501 may encompass the same descriptions which were heretofore applied to the assembly 1. In the assembly 501, the article 526 is in the shape of a bear. The bear may represent the mascot of a user's favorite sports team, in which case the article 526 may additionally display the colors and/or name of the team. Alternatively, the article 526 may be colored brown or black to resemble the appearance of a bear. Still further in the alternative, the article 526 may be provided in the shape of an alternative animal the image of which the user desires to display on the vehicle interior 60.

Referring next to FIG. 16 of the drawings, another non-limiting example of an universally positional article mounting assembly is generally indicated by reference numeral 601, in which like elements corresponding to those of the assembly 1 in FIGS. 1-5 are designated by like reference numerals in the 601-699 series. Unless otherwise noted, the elements and features of the assembly 601 may encompass the same descriptions which were heretofore applied to the assembly 1. A universally manipulatable article stem 620 may extend from the tab insert edge 607 of the mounting tab 602. A spring mount base 642 may be provided on the article stem 620. A flexible, coiled article spring 644 may have a proximal spring end 645 which is attached to the spring mount base 642. The article 626 may be attached to a distal spring end 646 of the article spring 620. Thus, the article stem 620, the spring mount base 642 and the article spring 644 may flexibly connect the article 626 to the mounting tab 602. Accordingly, in mounting of the assembly 601 on the vehicle interior 60 (FIG. 12), the article stem 620 facilitates universal positioning capability of the article 626. The flexible article spring 644 facilitates movement of the article 626 relative to the stationary mounting tab 602 during movement of the vehicle. Such movement of the article 626 may engage the attention of the occupants in the vehicle.

Referring next to FIG. 16B of the drawings, another non-limiting example of an universally positional article mounting assembly is generally indicated by reference numeral 601a, in which like elements corresponding to those of the assembly 601 in FIG. 16A are designated by like reference numerals. An article mount loop 647 may terminate the distal spring end 646 of the article spring 644. An article 626 in the shape of a display panel or the like may be inserted in the article mount loop 647. Accordingly, in mounting of the assembly 601 on the vehicle interior 60 (FIG. 12), the article stem 620 facilitates universal positioning capability of the article 626 and the flexible article spring 620 facilitates movement of the article 626 relative to the stationary mounting tab 602 during movement of the vehicle.

Referring next to FIGS. 17-20 and 22-24 of the drawings, another alternative illustrative embodiment of the universally positional article mounting assemblies is generally indicated by reference numeral 701 in FIGS. 18-20 and 22-24. In the assembly 701, elements which are analogous to the respective elements of the assembly 1 that was heretofore described with respect to FIGS. 1-5 are designated by the same numerals in the 701-799 series in FIGS. 17-20 and FIGS. 22-24. Unless otherwise noted, the elements and features of the assembly 701 may encompass the same descriptions which were heretofore applied to the assembly 1. As particularly illustrated in FIG. 17, the mounting tab 702 of the assembly 701 may include as tab base 776 which may be provided on the distal stem end 722 of the article stem 720 at the article mount edge 707 of the tab panel 703. The tab base 776 has a tab base thickness 778. A tab middle segment 782 may extend from the tab base 776. The tab middle segment 782 has a middle segment thickness 784 which may be less than the tab base thickness 778 of the tab base 776. A tab insertion segment 788 may extend from the tab middle segment 782. The tab insertion segment 788 has an insertion segment thickness 790 which may be less than the middle segment thickness 784 of the tab middle segment 782.

The tab base 776 of the mounting tab 702 may include a pair of opposite, generally planar tab base crevice engaging surfaces 777. The tab base 776 may have a tab base thickness 778 which corresponds to the distance between the tab base crevice engaging surfaces 777. In some embodiments, the tab base thickness 778 of the tab base 776 may range from about 2.25 mm to about 2.75 mm.

The tab middle segment 782 of the mounting tab 702 may have a pair of opposite, generally planar middle segment crevice engaging surfaces 783. A pair of beveled tab base transition surfaces 779 may angle from the tab base crevice engaging surfaces 777 of the tab base 776 to the respective crevice engaging surfaces 783 of the tab middle segment 782. The tab middle segment 782 may have a middle segment thickness 784 which corresponds to the distance between the middle segment crevice engaging surfaces 783. In some embodiments, the middle segment thickness 784 of the tab middle segment 782 may be about 0.8 mm.

Figure 17:
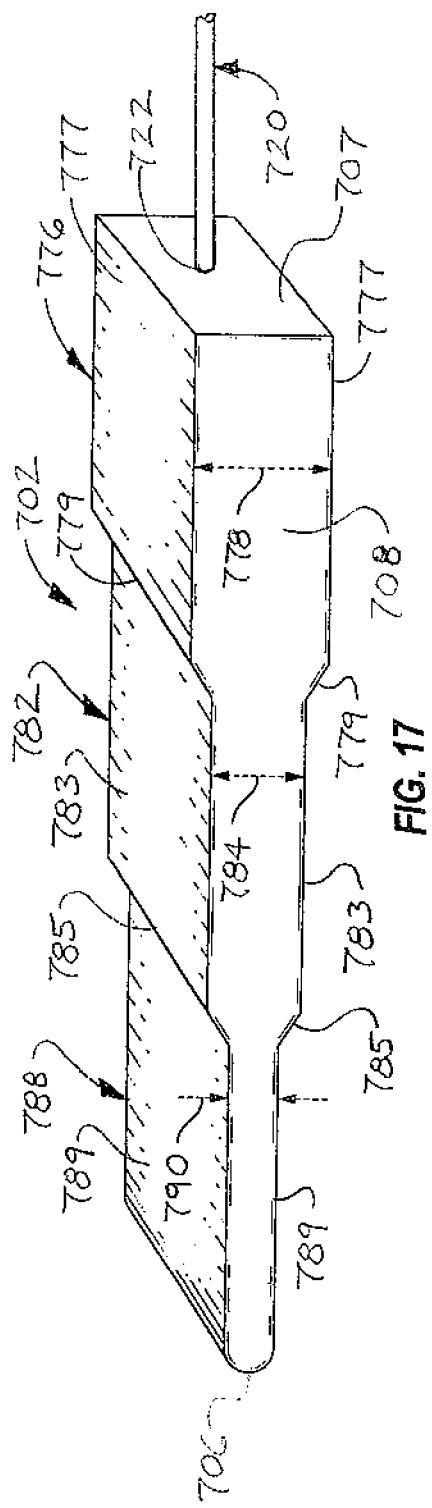
FIG. 17 is a side perspective view of a multi-tiered mounting tab having various thicknesses according to another illustrative embodiment of the universally positional article mounting assemblies.

The tab insertion segment 788 of the mounting tab 702 may include a pair of opposite, planar insertion segment crevice engaging surfaces 789. A pair of beveled middle segment transition surfaces 785 may angle from the middle segment crevice engaging surfaces 783 of the tab middle segment 782 to the respective insertion segment crevice engaging surfaces 789 of the tab insertion segment 788. The tab insertion segment 788 may have an insertion segment thickness 790 which corresponds to the distance between the insertion segment crevice engaging surfaces 789. In some embodiments, the insertion segment thickness 790 may be about 0.5 mm. The tab insertion segment 788 may have a tab insert end 706 which may be generally rounded cross-section, as illustrated in FIG. 17.

As illustrated in FIGS. 18-20, the assembly 701 may be attached to the vehicle interior 60 by inserting the mounting tab 702 into a crevice 80 in the dashboard or other selected location or position within the vehicle interior 60. Accordingly, the tab base thickness 778, the middle segment thickness 784 and the insertion segment thickness 790 (FIG. 17) of the respective tab base 776, tab middle segment 782 and tab insertion segment 788 accommodate the various widths of different crevices 80 in the vehicle interior 60. As illustrated in FIG. 18, under circumstances in which the crevice 80 is about 0.5 mm in width, the tab insertion segment 788 of the mounting tab 702 may be inserted into the crevice 80 with the crevice engaging surfaces 789 (FIG. 17) on the tab insertion segment 788 engaging the respective interior surfaces of the crevice 80. The middle segment transition surfaces 785 on the tab middle segment 782 may engage the vehicle interior 60 as the tab middle segment 782 and the tab base 776 typically remain outside the crevice 80. Thus, the insertion segment thickness 790 (FIG. 17) of the tab insertion segment 788 is sufficient to facilitate snug engagement of the insertion segment crevice engaging surfaces 789 with the respective interior surfaces of the crevice 80 and securely and yet detachably attach or mount the assembly 701 on the vehicle interior 60. As was heretofore described with respect to the assembly 1 in FIGS. 1-5, the article stem 720 can be selectively bended, twisted and/or otherwise physically manipulated to orient the article 726 at a selected two-dimensional or three-dimensional spatial orientation or position for display and/or access, retrieval and use by an occupant of the vehicle.

As illustrated in FIG. 19, under circumstances in which the crevice 80 has a width of about 0.8 mm, both the tab insertion segment 788 and the tab middle segment 782 may be inserted into the crevice 80 with the middle segment crevice engaging surfaces 783 (FIG. 17) on the tab middle segment 782 engaging the respective interior surfaces of the crevice 80. The tab base transition surfaces 779 may engage the vehicle interior 60 as the tab base 776 typically remains outside the crevice 80.

As illustrated in FIG. 20, under circumstances in which the crevice 80 has a width of typically from about 0.25 mm to about 2.75 mm, the tab insertion segment 788, the tab middle segment 782 and the tab base 776 may be inserted into the crevice 80. The tab base crevice engaging surfaces 777 on the tab base 776 engage the respective interior surfaces of the crevice 80. In the foregoing manner, the tab base 776, the tab middle segment 782 and the tab insertion segment 788 facilitate a snug or tight fit of the mounting tab 702 in the crevice 80 irrespective of the various widths of crevices 80 at different locations or positions within the vehicle interior 60.

Figure 21:
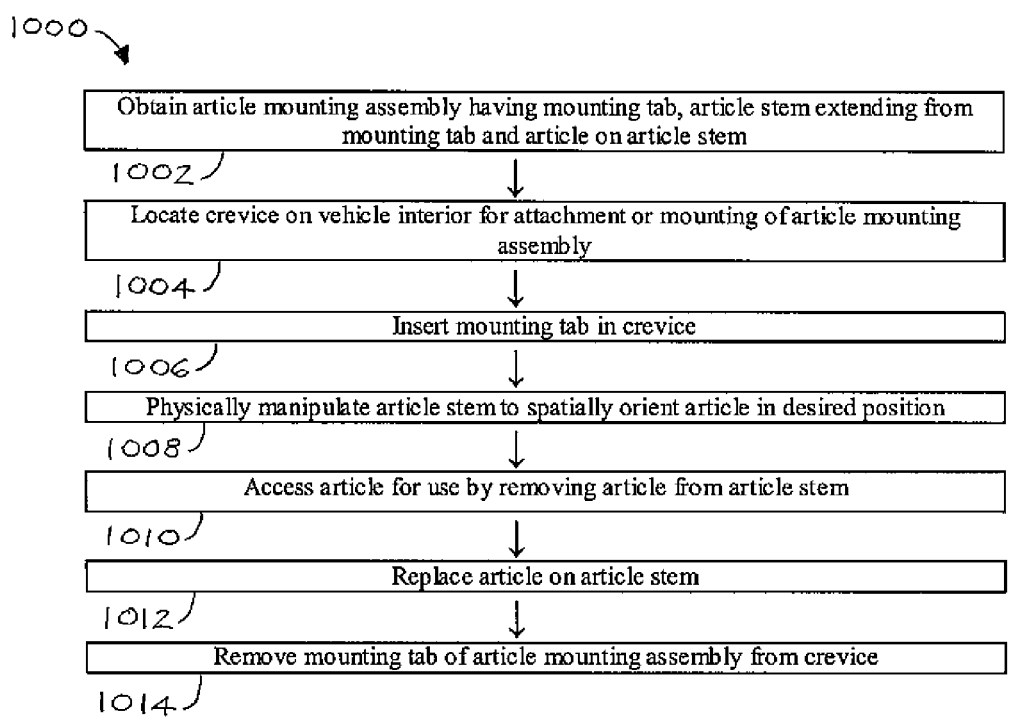
FIG. 21 is a flow diagram of an illustrative embodiment of the universally positional article mounting methods.
Figure 22:
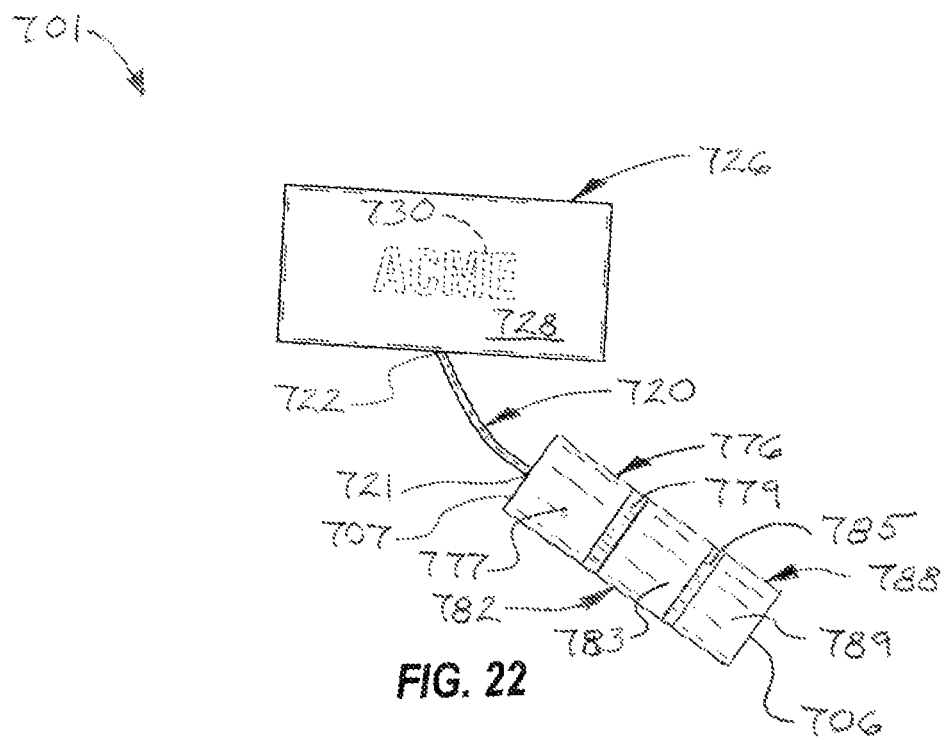
FIG. 22 is a front view of yet another illustrative universally positional article mounting assembly, with the article stem disposed in a gradual bend and the article deployed in another orientation for display in the vehicle interior.
Figures 23, 24:
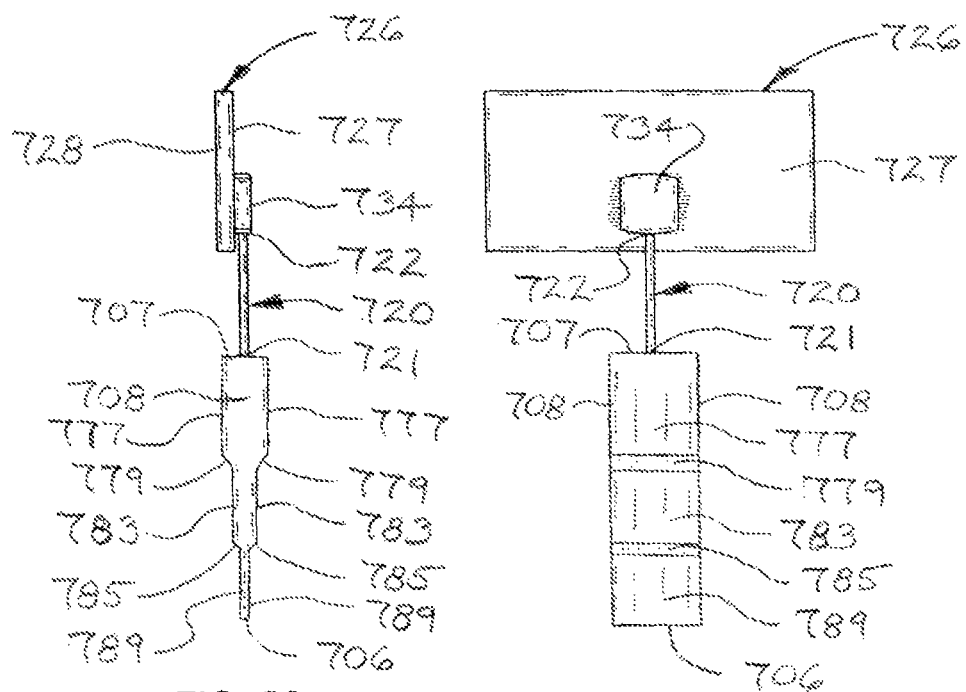
FIG. 23 is a side view of the illustrative universally positional article mounting assembly illustrated in FIG. 22.
FIG. 24 is a rear view of the illustrative universally positional article mounting assembly illustrated in FIG. 22.

Referring next to FIG. 21 of the drawings, a flow diagram of an illustrative embodiment of the universally positional article mounting methods is generally indicated by reference numeral 1000. At block 1002, a universally positional article mounting assembly is obtained. The universally positional article mounting assembly may include a mounting tab, an article stem extending from the mounting tab and at least one article on the article mounting tab. In some embodiments, the article may include at least one primary article and at least one secondary article may be detachably supported by the primary article. The elements and features of the universally positional article mounting assembly may encompass the same descriptions which were heretofore applied to the various illustrative embodiments of the universally positional article mounting assemblies which were heretofore described in the drawings. In some embodiments, the mounting tab may be substantially uniform in thickness throughout its length. The mounting tab may have a thickness of at least about 0.5 mm and preferably, about 0.8 mm. In some embodiments the thickness of the mounting tab may range from about 0.5 mm to about 2.75 mm. At block 1004, a crevice on the vehicle interior which is suitable for attachment or mounting of the universally positional article mounting assembly is located. At block 1006, the mounting tab of the universally positional article mounting assembly is inserted in the crevice. At block 1008, the article stem may be physically manipulated to spatially orient the article in the desired position for display and/or access and retrieval of the article for use.

At block 1010, in some embodiments, the article may be accessed for use by removing the article from the article stem. Alternatively, at least one secondary article may be removed from at least one primary article on the article stem for use. After use, at block 1012 the article may be replaced on the article stem or the secondary article may be replaced on the primary article. At block 1014, the mounting tab of the universally positional article mounting assembly may be removed from the crevice.

While the embodiments of the disclosure have been described above, it will be recognized and understood that various modifications can be made and the appended claims are intended to cover all such modifications which may fall within the spirit and scope of the disclosure.

What is claimed is:

1. A universally positional article mounting assembly, comprising:
   a substantially rigid, incompressible mounting tab including:
      a tab base having a tab base thickness of no greater than about 2.75 mm;
      a tab middle segment extending from the tab base, the tab middle segment having a middle segment thickness less than the tab base thickness of the tab base; and
      a tab insertion segment extending from the tab middle segment, the tab insertion segment having an insertion segment thickness less than the middle segment thickness of the tab middle segment;
   a universally manipulatable article stem carried by the tab base of the mounting tab, the article stem including a bendable, pliable or workable metal or material; and
   at least one article carried by the article stem, the article stem can be selectively bent, rotated, twisted and otherwise universally spatially manipulated into a desired two-dimensional or three-dimensional position or configuration and holds its position when released to support or hold the at least one article in a desired orientation.

2. A universally positional article mounting assembly, comprising:
   a substantially rigid, incompressible mounting tab including:
      a tab base having a tab base thickness of no greater than about 2.75 mm;
      a tab middle segment extending from the tab base, the tab middle segment having a middle segment thickness less than the tab base thickness of the tab base; and
      a tab insertion segment extending from the tab middle segment, the tab insertion segment having an insertion segment thickness less than the middle segment thickness of the tab middle segment;
   a universally manipulatable article stem carried by the tab base of the mounting tab, the article stem including a bendable, pliable or workable metal or material;
   at least one article carried by the article stem, the article stem can be selectively bent, rotated, twisted and otherwise universally spatially manipulated into a desired two-dimensional or three-dimensional position or configuration to support or hold the at least one article in a desired orientation; and
   the tab base comprises a pair of generally planar, spaced-apart tab base crevice engaging surfaces; the tab middle segment comprises a pair of generally planar, spaced-apart middle segment crevice engaging surfaces; and the tab insertion segment comprises a pair of generally planar, spaced-apart insertion segment crevice engaging surfaces.

3. The universally positional article mounting assembly of claim 2 wherein the tab base thickness ranges from about 2.25 mm to about 2.75 mm.

4. The universally positional article mounting assembly of claim 3 wherein the middle segment thickness is about 0.8 mm.

5. The universally positional article mounting assembly of claim 4 wherein the insertion segment thickness is about 0.5 mm.

6. A universally positional article mounting assembly, comprising:
   a substantially rigid, incompressible mounting tab including:
      a tab base having a tab base thickness of no greater than about 2.75 mm, the tab base having a pair of generally planar, spaced-apart tab base crevice engaging surfaces;
      a tab middle segment extending from the tab base, the tab middle segment having a middle segment thickness less than the tab base thickness of the tab base, the tab middle segment having a pair of generally planar, spaced-apart middle segment crevice engaging surfaces; and a tab insertion segment extending from the tab middle segment, the tab insertion segment having an insertion segment thickness less than the middle segment thickness of the tab middle segment, the tab insertion segment having a pair of generally planar, spaced-apart insertion segment crevice engaging surfaces;

a universally manipulatable article stem carried by the tab base of the mounting tab; and at least one article carried by the article stem; and a pair of beveled tab base transition surfaces extending from the tab base crevice engaging surfaces of the tab base to the middle segment crevice engaging surfaces, respectively, of the tab middle segment and a pair of beveled middle segment transition surfaces extending from the middle segment crevice engaging surfaces of the tab middle segment to the insertion segment crevice engaging surfaces, respectively, of the tab insertion segment.

7. A universally positional article mounting assembly, comprising:

a substantially rigid, incompressible mounting tab including:

a tab base having a tab base thickness of no greater than about 2.75 mm, the tab base thickness ranges from about 2.25 mm to about 2.75 mm, the tab base having a pair of generally planar, spaced-apart tab base crevice engaging surfaces;

a tab middle segment extending from the tab base, the tab middle segment having a middle segment thickness less than the tab base thickness of the tab base, the middle segment thickness is about 0.8 mm, the tab middle segment having a pair of generally planar, spaced-apart middle segment crevice engaging surfaces; and a tab insertion segment extending from the tab middle segment, the tab insertion segment having an insertion segment thickness less than the middle segment thickness of the tab middle segment, the insertion segment thickness is about 0.5 mm, the tab insertion segment having a pair of generally planar, spaced-apart insertion segment crevice engaging surfaces;

a universally manipulatable article stem carried by the tab base of the mounting tab; and at least one article carried by the article stem;

wherein the tab base comprises a pair of generally planar, spaced-apart tab base crevice engaging surfaces; the tab middle segment comprises a pair of generally planar, spaced-apart middle segment crevice engaging surfaces; and the tab insertion segment comprises a pair of generally planar, spaced-apart insertion segment crevice engaging surfaces; and a pair of beveled tab base transition surfaces extending from the tab base crevice engaging surfaces of the tab base to the middle segment crevice engaging surfaces, respectively, of the tab middle segment and a pair of beveled middle segment transition surfaces extending from the middle segment crevice engaging surfaces of the tab middle segment to the insertion segment crevice engaging surfaces, respectively, of the tab insertion segment.

8. A universally positional article mounting method, comprising:

obtaining an article mounting assembly having a substantially rigid, incompressible mounting tab having a thickness of from about 0.5 mm to about 2.75 mm, a universally manipulatable article stem extending from the mounting tab and at least one article on the article stem, the article stem including a bendable, pliable or workable metal or material, wherein obtaining an article mounting assembly comprises obtaining an article mounting assembly having the mounting tab, the universally manipulatable article stem extending from the mounting tab, at least one primary article on the article stem and at least one secondary article detachably carried by the at least one primary article;

locating a crevice having a width of at most about 2.75 mm on a vehicle interior for attachment of the article mounting assembly to the vehicle interior;

inserting the mounting tab of the article mounting assembly in the crevice; and physically bending, rotating, twisting and universally spatially manipulating the article stem in a desired two-dimensional or three-dimensional position or configuration to spatially orient and support or hold the article in a desired orientation, the article stem holds its position when released.

9. The universally positional article mounting method of claim 8 wherein obtaining an article mounting assembly comprises obtaining an article mounting assembly having the mounting tab, the universally manipulatable article stem extending from the mounting tab, at least one primary article on the article stem and at least one secondary article detachably carried by the at least one primary article.

10. A universally positional article mounting assembly, comprising:

a substantially rigid, incompressible mounting tab including:

a tab base having a tab base thickness of no greater than about 2.75 mm, the tab base thickness ranges from about 2.25 mm to about 2.75 mm, the tab base having a pair of generally planar, spaced-apart tab base crevice engaging surfaces;

a tab middle segment extending from the tab base, the tab middle segment having a middle segment thickness less than the tab base thickness of the tab base, the middle segment thickness is about 0.8 mm, the tab middle segment having a pair of generally planar, spaced-apart middle segment crevice engaging surfaces; and a tab insertion segment extending from the tab middle segment, the tab insertion segment having an insertion segment thickness less than the middle segment thickness of the tab middle segment, the insertion segment thickness is about 0.5 mm, the tab insertion segment having a pair of generally planar, spaced-apart insertion segment crevice engaging surfaces;

a universally manipulatable article stem carried by the tab base of the mounting tab; and at least one article carried by the article stem;

wherein the tab base comprises a pair of generally planar, spaced-apart tab base crevice engaging surfaces; the tab middle segment comprises a pair of generally planar, spaced-apart middle segment crevice engaging surfaces; and the tab insertion segment comprises a pair of generally planar, spaced-apart insertion segment crevice engaging surfaces; and a pair of beveled tab base transition surfaces extending from the tab base crevice engaging surfaces of the tab base to the middle segment crevice engaging surfaces, respectively, of the tab middle segment and a pair of beveled middle segment transition surfaces extending from the middle segment crevice engaging surfaces of the tab middle segment to the insertion segment crevice engaging surfaces, respectively, of the tab insertion segment.

* * * * *